(12) United States Patent
Pruett et al.

(10) Patent No.: US 9,112,199 B2
(45) Date of Patent: Aug. 18, 2015

(54) FUEL CELL SYSTEM AND METHOD (75) Inventors: James A. Pruett, Allen, TX (US); Byron E. Short, Jr., Fairview, TX (US); Howard C. Choe, Southlake, TX (US)

(73) Assignee: Raytheon Company, Waltham, MA (US)

( * ) Notice: Subject to any disclaimer, the term of this patent is extended or adjusted under 35 U.S.C. 154(b) by 260 days.

(21) Appl. No.: 13/364,780

(22) Filed: Feb. 2, 2012

(65) Prior Publication Data

US 2012/0202136 A1 Aug. 9, 2012

Related U.S. Application Data (60) Provisional application No. 61/439,495, filed on Feb. 4, 2011, provisional application No. 61/439,499, filed on Feb. 4, 2011.

(51) Int. Cl.
*H01M 8/22* (2006.01)
*H01M 8/04* (2006.01)
*H01M 8/00* (2006.01)
*H01M 8/12* (2006.01)

(52) U.S. Cl.
CPC .......... *H01M 8/04208* (2013.01); *H01M 8/002* (2013.01); *H01M 8/04201* (2013.01); *H01M 8/1233* (2013.01); *H01M 2250/30* (2013.01); *Y02B 90/18* (2013.01); *Y02E 60/50* (2013.01)

(58) Field of Classification Search
CPC .................... H01M 8/04208; H01M 2250/30; H01M 8/04201
USPC .......................................................... 429/505
See application file for complete search history.

(56) References Cited

U.S. PATENT DOCUMENTS

| | | | | |
|---|---|---|---|---|
| 5,728,464 | A | * | 3/1998 | Checketts ...................... 428/403 |
| 6,773,843 | B2 | | 8/2004 | Kitagawa et al. ............... 429/32 |
| 6,924,054 | B2 | * | 8/2005 | Prasad et al. .................. 429/416 |
| 7,648,792 | B2 | | 1/2010 | Kaschmitter et al. .......... 429/34 |
| 2004/0086755 | A1 | | 5/2004 | Kalal ............... 429/19 |
| 2005/0058876 | A1 | * | 3/2005 | Fujita et al. ..................... 429/34 |
| 2005/0115637 | A1 | * | 6/2005 | Adams et al. ................. 141/351 |
| 2006/0030652 | A1 | * | 2/2006 | Adams et al. ................. 524/210 |
| 2006/0083959 | A1 | | 4/2006 | Eritate et al. |
| 2007/0099056 | A1 | * | 5/2007 | Kono et al. ..................... 429/34 |
| 2008/0187798 | A1 | | 8/2008 | McLean et al. ................. 429/17 |
| 2008/0272128 | A1 | * | 11/2008 | Norimatsu et al. ........... 220/500 |

FOREIGN PATENT DOCUMENTS

WO WO 2004/051781 A2 6/2004
WO WO 2007/148117 A1 12/2007

OTHER PUBLICATIONS

Notification of Transmittal of the International Search Report and the Written Opnion of the International Searching Authority, or the Declaration dated Jun. 5, 2012 in connection with International Patent Application No. PCT/US2012/023699.

* cited by examiner

*Primary Examiner* — Jonathan Jelsma (57) ABSTRACT

In certain embodiments, a cartridge includes a fuel chamber configured to store a fuel. The fuel chamber has a fuel outlet port configured to interface with a fuel inlet port of a fuel cell such that the fuel may be supplied to the fuel cell. The cartridge further comprises an oxidizing agent chamber configured to store an oxidizing agent. The oxidizing agent chamber has an oxidizing agent outlet port configured to interface with an oxidizing agent inlet port of the fuel cell such that the oxidizing agent may be provided to the fuel cell.

21 Claims, 4 Drawing Sheets

FUEL CELL SYSTEM AND METHOD

RELATED APPLICATION

This application claims benefit under 35 U.S.C. §119(e) of U.S. Provisional Application Ser. No. 61/439,495, entitled "FIELD RECHARGEABLE FUEL CELL," filed Feb. 4, 2011, and U.S. Provisional Application Ser. No. 61/439,499, entitled "RUGGEDIZED SELF-CONTAINED FUEL CELL," filed Feb. 4, 2011.

BACKGROUND

Fuel cells are electrochemical energy conversion devices that convert chemical energy into electrical energy through chemical reactions between hydrogen and oxygen. Typically, hydrogen is either directly supplied to the fuel cell or produced from petrochemicals such as propane, methane, butane, or other source. Fuel cells generally comprise three layered segments: the anode, the membrane or electrolyte, and the cathode. At the anode, a catalyst oxidizes hydrogen gas from a fuel source, converting the hydrogen gas into positively charged ions (hydrogen protons) and negatively charged ions (electrons). The electrolyte or membrane then separates the generated protons and electrons by allowing the protons to pass through while preventing passage of the electrons. The separated electrons travel through a wire, creating the electric current, while the protons travel through the electrolyte to the cathode. While hydrogen is fed to the anode, oxygen (e.g., typically obtained from air) is fed to the cathode where a catalyst creates oxygen ions. Thus, at the cathode, the arriving hydrogen protons and electrons bond with the oxygen ions, creating water and heat as waste products of the reaction. Some of the water is reused or recycled for use in humidification or maintaining the fuel cell's internal temperature and the rest exits through an exhaust pipe.

The electrical energy generated by the above-described components of a fuel cell may be supplied to an external device. Thus, a fuel cell may act as a replacement for conventional sources of electrical energy, such as batteries. Unlike batteries, which store a limited amount of electrical energy chemically (i.e., a thermodynamically closed system), fuel cells consume reactant and oxidant from external sources (i.e., a thermodynamically closed system) and thus can operate continuously such that the reactant and oxidant supplies are maintained.

SUMMARY

In certain embodiments, a fuel cell system includes a fuel cartridge comprising a chamber configured to store a compressed gas, the compressed gas containing an oxidizing agent. The system further includes a fuel cell coupled to the fuel cartridge. The fuel cell is configured to receive compressed gas from the fuel cartridge, receive a fuel, and generate electrical energy using the received fuel and the oxidizing agent contained in the received compressed gas.

In certain embodiments, a cartridge includes a fuel chamber configured to store a fuel. The fuel chamber has a fuel outlet port configured to interface with a fuel inlet port of a fuel cell such that the fuel may be supplied to the fuel cell through the ports. The cartridge further includes an oxidizing agent chamber configured to store an oxidizing agent. The oxidizing agent chamber has an oxidizing agent outlet port configured to interface with an oxidizing agent inlet port of the fuel cell such that the oxidizing agent may be provided to the fuel cell through the ports.

Certain embodiments of the present disclosure may provide one or more technical advantages. In certain embodiments, the fuel cell system includes a fuel cartridge that stores a compressed gas containing an oxidizing agent (e.g., oxygen) to be provided to a fuel cell, which may reduce or eliminate the need for the fuel cell to draw air from its surroundings. In certain embodiments, the compressed gas stored in the fuel cartridge is replenished easily (e.g., by coupling the fuel cartridge to a valve stem of a tire or through actuating a hand pump affixed to the fuel cartridge). The fuel chamber of the cartridge may be configured to store a liquid fuel that is replenishable by a user (e.g., a soldier) in the field with any of a number of readily available liquid fuels (e.g., diesel, gasoline, etc.). Additionally, in certain embodiments, at least a portion of the compressed gas in the oxidizing agent chamber surrounds a portion of the fuel chamber (e.g., a flexible bladder), thereby pressurizing the liquid fuel in the bladder such that the liquid fuel may be provided to the fuel cell.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF EXAMPLE EMBODIMENTS

Figure 1A:
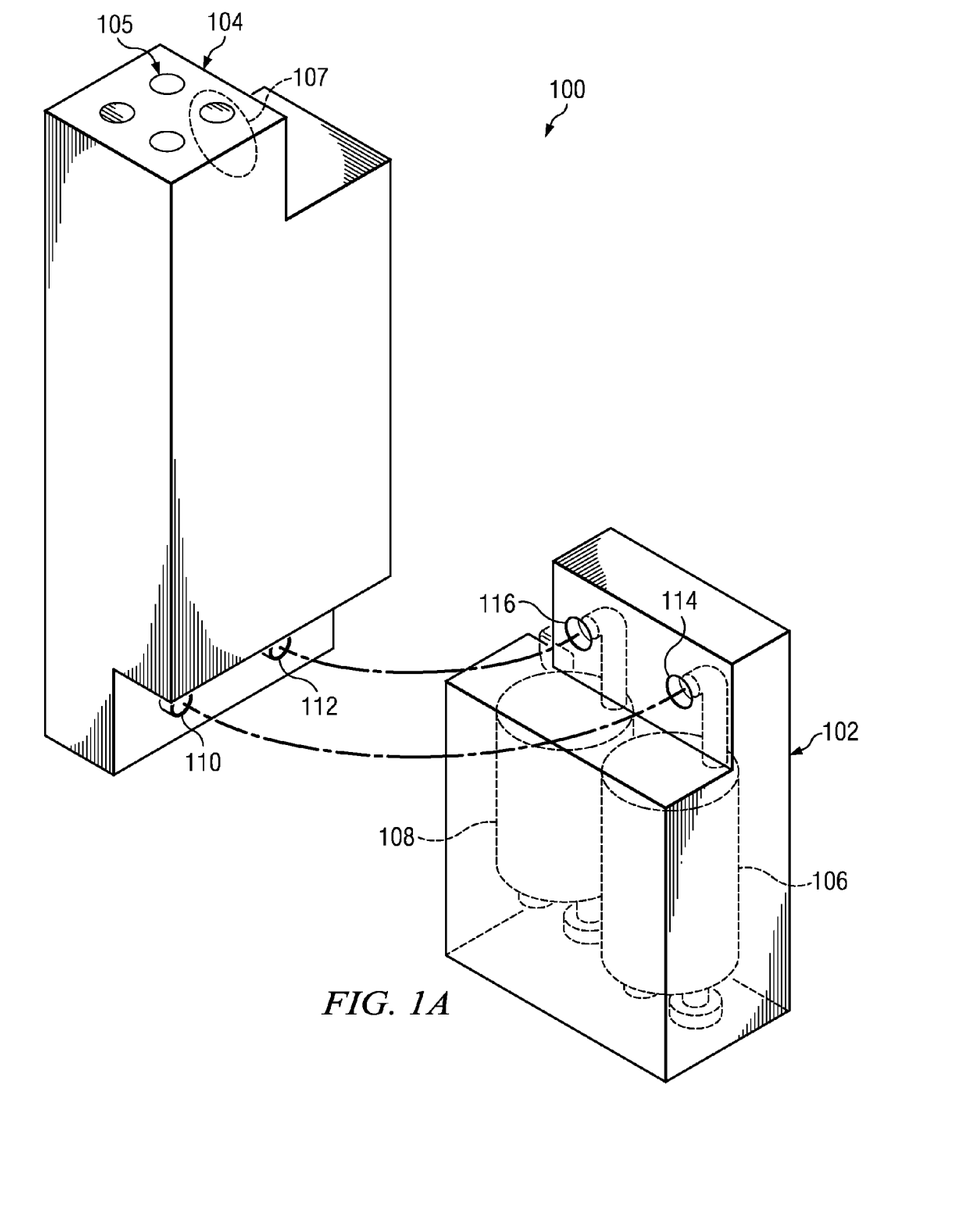
FIGS. 1A and 1B illustrate an example field-rechargeable fuel cell system.

FIG. 1A illustrates an example field-rechargeable fuel cell system 100. Fuel cell system 100 includes a fuel cartridge 102 and a fuel cell 104. Fuel cartridge 102 includes a fuel chamber 106 that stores fuel and an oxidizing agent chamber 108 that stores a compressed gas that includes an oxidizing agent. In certain embodiments, fuel cartridge 102 is configured to interface with fuel cell 104 such that the contents of fuel cartridge 102 (e.g., fuel stored in fuel chamber 106 and oxidizing agent stored in oxidizing agent chamber 108) may be provided to fuel cell 104. For example, in certain embodiments, a fuel inlet port 110 and oxidizing agent inlet port 112 of the fuel cell 104 are respectively coupled to a fuel outlet port 114 and oxidizing agent outlet port 116 of fuel cartridge 102. Fuel cell 104 is operable to use fuel received through fuel inlet port 110 and oxidizing agent received through oxidizing agent inlet port 112 to generate electrical energy. The generated electrical energy may be provided to a load, such as a military radio or any other suitable device via electrical input and output (I/O) 107.

In certain embodiments, fuel cell system 100 is field-rechargeable. That is, the oxidizing agent and/or fuel of fuel cell system 100 may be replenished at a remote location, such as a military zone, battlefield, worksite, or other location where specialty fuels or compressed gas tanks typically are unavailable or otherwise difficult to access. This feature will be described in greater detail in connection with FIGS. 2-4.

Fuel cell 104 may include any suitable device operable to generate electrical energy from a reaction between the fuel received from fuel chamber 106 of fuel cartridge 102 and the oxidizing agent received from oxidizing agent chamber 108 of fuel cartridge 102. For example, fuel cell 104 may comprise a standard fuel cell having an anode, an electrolyte, and a cathode collectively operable to generate electrical energy from a fuel and an oxidizing agent. Fuel cell 104 may also include any additional components that facilitate the generation of electrical energy using fuel and an oxidizing agent. For example, fuel cell 104 may include one or more of the following components: a regulator for maintaining fuel received from fuel cartridge 102 at a proper pressure and/or for pressurizing liquid fuel into a gas form; a controller for maintaining a proper ratio of fuel intake to oxidizing agent intake and/or for limiting the amount of fuel and/or oxidizing agent drawn based on load conditions; a fuel pump for drawing fuel from fuel cartridge 102 into fuel cell 104; a thermal management unit (e.g. a heatsink and/or fan) for cooling fuel cell 104; and a rechargeable battery for powering any suitable component of fuel cell 104 (that may be recharged through electrical contacts 105). In certain embodiments, the rechargeable battery also provides electrical power through electrical I/O 107 during a period of time when fuel cell 104 is disconnected from fuel cartridge 102 (e.g., during recharging of the fuel cartridge 102).

As described above, fuel cartridge 102 includes an oxidizing agent chamber 108. Oxidizing agent chamber 108 may include any suitable chamber adapted to receive an oxidizing agent or a container holding an oxidizing agent. The oxidizing agent may be a substance that removes electrons from a reactant in a chemical reaction. The oxidizing agent may include any suitable oxidizing agent usable by fuel cell 104 (in conjunction with fuel) to generate electrical energy. For example, an oxidizing agent may include oxygen contained in compressed air. As an additional example, the oxidizing agent may include oxygen contained in compressed oxygen gas. In certain embodiments, oxidizing agent chamber 108 may be configured to contain a compressed gas including an oxidizing agent (for example, the compressed gas may be housed in oxidizing agent chamber 108). In certain other embodiments, oxidizing agent chamber 108 is configured to receive a separate cylinder containing an oxidizing agent (e.g., an interchangeable compressed gas cylinder may be inserted into oxidizing agent chamber 108). In certain embodiments, the compressed gas stored in oxidizing agent chamber 108 has a pressure that is greater than the pressure of ambient air outside of the fuel cell system 100. For example, the compressed gas may have a pressure greater than 30 pounds per square inch (psi), and in certain instances may have a pressure greater than 100 psi. These example pressures are provided for example purposes only.

Fuel cell 104 being adapted to receive the oxidation agent from the oxidizing agent chamber 108 of the fuel cartridge 102 may reduce or eliminate the need for fuel cell 104 to draw air from its surroundings during operation. In certain embodiments, reducing or eliminating the need for fuel cell 104 to draw air from its surroundings may provide various advantages. For example, the need for an air pump supplying air to fuel cell 104 may be reduced or eliminated. As another example, the need for fuel cell 104 to include a filtering device (as is used for fuel cells drawing potentially polluted air from outside the fuel cell system 100) may be reduced or eliminated because the compressed gas contained in oxidizing agent chamber 108 may be obtained from a clean source. As a further example, fuel cell 104 may gain the ability to operate when no outside air source is available (e.g., the fuel cell 104 is submerged in water or covered in dirt, clothing, or other material). As yet another example, the performance of fuel cell 104 does not decrease at high altitudes where air may include relatively low amounts of oxygen.

In certain embodiments, the oxidation agent that fuel cell 104 uses during the generation of electrical power comes mostly or solely from compressed gas (e.g., compressed air) stored in the oxidizing agent chamber 108 (as opposed to ambient air around fuel cell system 100). The compressed gas may be placed in oxidizing agent chamber 108 at any suitable time, but in certain embodiments is placed in oxidizing agent chamber 108 while fuel cell 104 is not operating (i.e., generating electricity). Thus, at least in some embodiments, oxidizing agent chamber 108 does not receive additional compressed gas or ambient air while it provides compressed gas to fuel cell 104. Accordingly, the compressed gas stored in oxidizing agent chamber 108 may be depleted gradually as the fuel cell 104 generates electricity.

As described above, fuel cartridge 102 may include a fuel chamber 106. Fuel chamber 106 may include any suitable chamber configured to receive a fuel. In certain embodiments, fuel chamber 106 may comprise a hard shell or a flexible bladder (described in further detail in connection with FIG. 3) configured to store fuel. The fuel may include any suitable fuel usable by fuel cell 104 (in conjunction with an oxidizing agent) to generate electrical energy. For example, fuel may include any suitable combination of methane, butane, propane, diesel, gasoline, other suitable fuel, and any other suitable fuel.

Figure 1B:
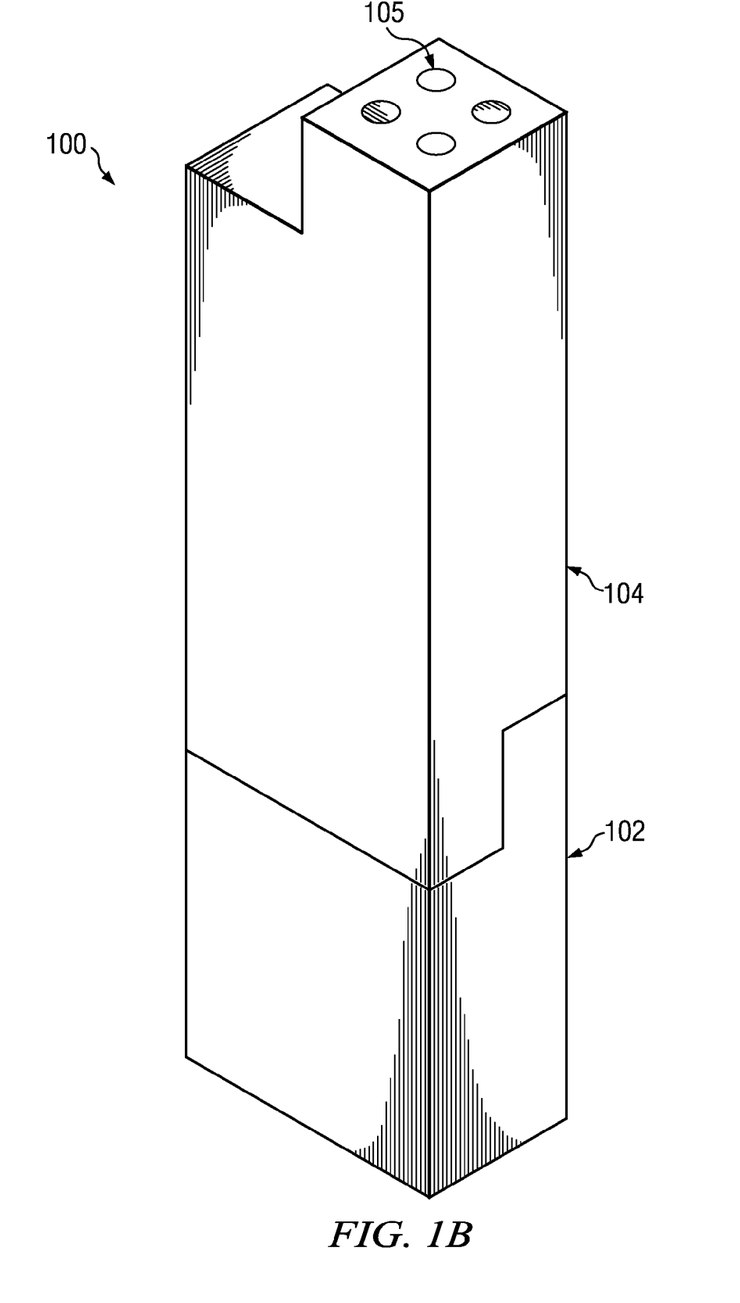

FIG. 1B illustrates example field-rechargeable fuel cell system 100. The embodiment in FIG. 1B depicts an example fuel cell system 100 wherein fuel cell 104 and fuel cartridge 102 are coupled together. In certain embodiments, fuel cell system 100 is easily portable. That is, fuel cell system may be easily carried by a user of fuel cell system 100.

Fuel cartridge 102 may have any suitable shape. In certain embodiments, fuel cartridge 102 may be shaped to conform generally to an entity with which or by whom fuel cartridge 102 is to be used. As just a few examples, fuel cartridge 102 may be shaped to conform generally to a wing of an unmanned aerial vehicle (UAV) such that it may be attached easily to the UAV, or may follow the contours of a portion of a human body, such that it may be comfortably attached to and transported by a person. As another example, in the embodiment depicted in FIG. 1B, fuel cartridge 102 is shaped such that, when attached to fuel cell 104, the fuel cell system 100 has a form factor that is compatible with a conventional battery, such as an LI-145 battery used in military radios. The electrical I/O 107 of fuel cell 104 may also be designed to match the electrical I/O of a conventional battery. In certain embodiments, fuel cell 104 is configured to interface with various sizes of fuel cartridges 102, such that fuel cell system 100 may be used in place of any of a plurality of conventional batteries that each includes a common electrical I/O. For example, a plurality of batteries may include a portion that is shaped similar to fuel cell 104, but may have varying lengths. Accordingly, fuel cartridges 102 may be manufactured with varying lengths to fit the various form factors of these batteries. Although fuel cell 104 and fuel cartridge 102 are shown as having particular dimensions in FIGS. 1A and 1B (e.g., fuel cell 104 is shown as having a height that is about twice the height of fuel cartridge 102), the present disclosure contemplates either of these components may have any suitable dimensions.

In certain embodiments, fuel cell system 100 may be used in place of a conventional battery and may provide advantages over conventional batteries. For example, fuel cell system 100 may be operable to supply electrical energy for a longer duration than conventional batteries, as fuel cell system 100 may be operable to generate electrical energy for as long as fuel cartridge 102 provides an adequate supply of fuel and an oxidizing agent.

In certain embodiments, fuel cell 104 may be located remotely from fuel cartridge 102. For example, fuel cartridge 102 may be located on a wing of a UAV and fuel cell 104 may be located within a cockpit or other enclosure of the UAV. In such embodiments, fuel cell system 100 may include a fuel line and an oxidizing agent line that each run between respective ports of the fuel cell 104 and fuel cartridge 102.

Figure 2:
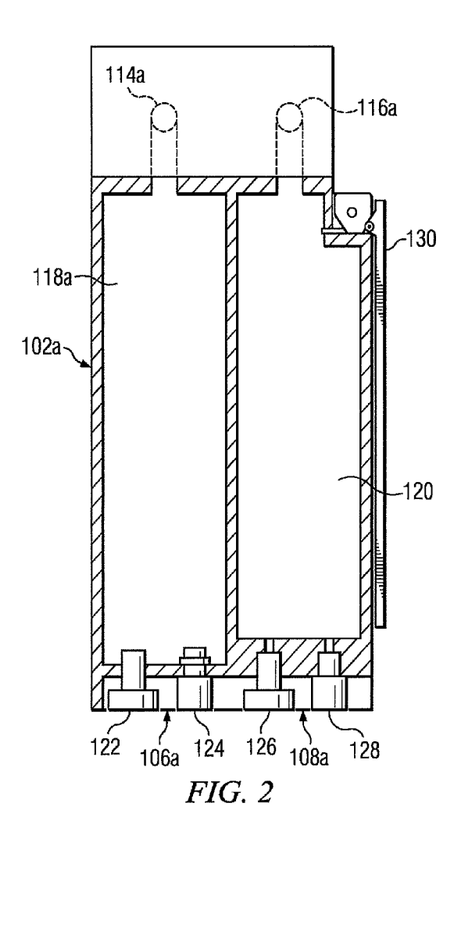
FIG. 2 illustrates an example fuel cartridge with a refillable fuel chamber and a refillable oxidizing agent chamber that may be included in the field-rechargeable fuel cell system of FIG. 1.

FIG. 2 illustrates an example fuel cartridge 102a with a refillable fuel chamber 106a and a refillable oxidizing agent chamber 108a that may be included in the field-rechargeable fuel cell system 100 of FIG. 1. For purposes of this example, fuel chamber 106a and oxidizing agent chamber 108a correspond respectively to fuel chamber 106 and oxidizing agent chamber 108 of FIG. 1. Fuel cartridge 102a further includes a fuel outlet port 114a and a oxidizing agent outlet port 116a that are configured to interface with fuel inlet port 110 and oxidizing agent inlet port 112, respectively, of fuel cell 104, such that fuel 118a and an oxidizing agent 120 may be supplied through these ports to fuel cell 104 while fuel cell 104 generates electrical power. In certain embodiments, outlet ports 114a and 116a may be removably attached to inlet ports 110 and 112. Accordingly, fuel cartridge 102a may be detached from fuel cell 104 at any appropriate time. For example, fuel cartridge 102a may be replaced by another fuel cartridge 102a (e.g., if it runs out of fuel 118a or oxidizing agent 120). As another example, fuel cartridge 102a may be removed from fuel cell 104 while fuel 118a or oxidizing agent 120 is replenished.

Fuel chamber 106a may store fuel 118a directly or may include an interchangeable container filled with fuel 118a. In embodiments in which fuel 118a comprises a compressed fuel (e.g., propane), fuel chamber 106a additionally may include a pressure gauge 122 indicating the pressure of fuel 118a in fuel chamber 106a. In addition or as an alternative, fuel cartridge 102a may include an electronic or mechanical device that provides an indication of the amount of fuel 118a remaining in fuel chamber 106a or an indication of how long the remaining fuel 118a will last.

Fuel chamber 106a may include a fill port 124 operable to receive additional fuel. Thus, the stored fuel 118a may be replenished as appropriate (e.g., in embodiments in which the fuel 118a is housed in fuel chamber 106a itself, as described above). For example, in embodiments in which fuel 118a is propane, fill port 124 may be any suitable port adapted to connect to a propane source, such as a propane tank. In various embodiments, fuel 118a may be replenished through fuel outlet port 114a.

Fuel cartridge 102a may include any suitable means for providing an indication of the amount of oxidizing agent 120 remaining in oxidizing agent chamber 108a. As an example, oxidizing agent chamber 108a may include a pressure gauge 126 indicating the pressure of the gas (e.g., compressed air and/or compressed oxygen) contained in oxidizing agent chamber 108a. As another example, fuel cartridge 102a may include an electronic or mechanical device that provides an indication of the amount of oxidizing agent 120 left in oxidizing agent chamber 108a or how long the remaining oxidizing agent 120 will last.

Oxidizing agent chamber 108a may include a fill port 128 such that the compressed gas containing oxidizing agent 120 may be replenished as appropriate through fill port 128 (e.g., in embodiments in which the compressed gas may be housed in oxidizing agent chamber 108a itself, as described above). For example, in embodiments in which oxidizing agent 120 is oxygen contained in compressed air, fill port 128 may include any suitable port adapted to connect to an air compressor, a compressed air tank, or any other suitable source of compressed air. In a specific example, fill port 128 may be configured to interface with a valve stem of a tire such that compressed air in the tire may be used to fill oxidizing agent chamber 108a. As another example, fill port 128 may be configured to interface with a bicycle pump such that compressed air generated by the bicycle pump may be used to fill oxidizing agent chamber 108a. In addition or as an alternative to fill port 128, oxidizing agent chamber 108a may include a hand pump 130 allowing a user to manually pressurize air in order to fill oxidizing agent chamber 108a. In a certain embodiment, oxidizing agent 120 may be replenished through oxidizing agent outlet port 116a.

Figure 3:
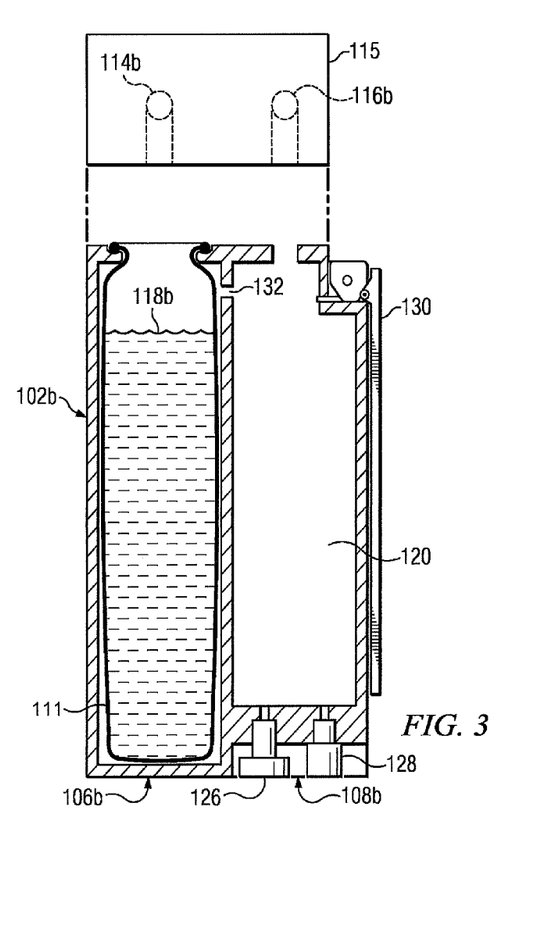
FIG. 3 illustrates an example fuel cartridge with a flexible bladder for storing liquid fuel and a refillable oxidizing agent chamber that may be included in the field-rechargeable fuel cell system of FIG. 1.

FIG. 3 illustrates an example fuel cartridge 102b with a flexible bladder 111 for storing liquid fuel 118b and a refillable oxidizing agent chamber 108b that may be included in the field-rechargeable fuel cell system 100 of FIG. 1. For purposes of this example, fuel chamber 106b and oxidizing agent chamber 108b correspond respectively to fuel chamber 106 and oxidizing agent chamber 108 of FIG. 1.

Fuel cartridge 102b further includes a port module 115 that is removably attachable to fuel chamber 106b and oxidizing agent chamber 108b. In the embodiment depicted, port module 115 includes fuel outlet port 114b and a oxidizing agent outlet port 116b that are configured to interface with fuel inlet port 110 and oxidizing agent inlet port 112 of fuel cell 104, such that fuel 118a and oxidizing agent 120 may be supplied through these ports to fuel cell 104 while fuel cell 104 generates electrical power. In other embodiments, detachable port module 115 includes either fuel outlet port 114b or oxidizing agent outlet port 116b. For example, in certain embodiments, only fuel outlet port 114b is removably attached to fuel chamber 106b while oxidizing agent outlet port 116b is permanently attached to oxidizing agent chamber 108b. In certain embodiments, outlet ports 114a and 116a are removably attached to inlet ports 110 and 112 such that fuel cartridge 102b may be removably coupled to fuel cell 104 in a manner similar to that described above with respect to fuel cartridge 102a.

In certain embodiments, fuel chamber 106b consists at least in part of a flexible bladder 111 suitable to store liquid fuel 118b. Bladder 111 may be configured such that a user (e.g., a soldier) may pour a liquid fuel 118b into bladder 111 after removing port module 115 or other lid sealing the fuel chamber 106b. As a result, a user (e.g., a soldier) may easily replenish the fuel supply of fuel cartridge 102 by adding additional liquid fuel 118b. Because some liquid fuels (e.g., diesel and/or gasoline) may be readily available to a user in the field (e.g., a soldier on a mission), liquid fuel 118b contained in fuel cartridge 106b may be replenished without the need for access to specialized fuel sources or additional fuel cartridges 106b.

Flexible bladder 111 may comprise any suitable material capable of holding liquid fuel 118b. For example, flexible bladder 111 may be made of rubber, fluorosilicone, nitrile, or another suitable material. Flexible bladder 111 may also be capable of storing fuel that includes, at least in part, a gaseous component. For example, flexible bladder 111 may store a liquid fuel 118b and vapor of the liquid fuel 118b.

In embodiments utilizing liquid fuel 118b, any suitable means may be used to provide an indication of the amount of remaining liquid fuel 118b in fuel chamber 106b. As an example, a gauge may indicate the amount of remaining fuel. In another embodiment, the flexible bladder 111 and/or fuel chamber 106b may be made of a translucent material such that a user may visually inspect the remaining liquid fuel 118b.

In certain embodiments, oxidizing agent chamber 108b may extend into the space surrounding flexible bladder 111 (e.g., via passage 132). As a result, the pressure of the compressed gas in oxidizing agent chamber 108a may pressurize the liquid fuel 118b contained in flexible bladder 111 through passage 132. In such embodiments, liquid fuel 118b contained in fuel chamber 106b may be provided through fuel outlet port 114b to fuel cell 104 without the need for additional components (e.g., a fuel pump). This may allow fuel cell system 100 to operate with lower heat and noise signatures, which may be particularly beneficial in military applications. Oxidizing agent chamber 108b may be filled with compressed gas containing oxidizing agent 120 through any suitable mechanism, such as oxidizing agent outlet port 116b, fill port 128, or hand pump 130.

Certain embodiments of the present disclosure may provide one or more technical advantages. In certain embodiments, fuel cell system 100 includes fuel cartridge 102 that stores compressed gas containing an oxidizing agent 120 (e.g., oxygen) to be provided to fuel cell 104, which may reduce or eliminate the need for fuel cell 104 to draw air from its surroundings. In certain embodiments, compressed gas stored in the fuel cartridge 102 is replenished easily (e.g., by coupling fuel cartridge 102 to a valve stem of a tire or through actuating hand pump 130 affixed to fuel cartridge 102). Fuel chamber 106 of fuel cartridge 102 may be configured to store a liquid fuel 118b that is replenishable by a user (e.g., a soldier) in the field with any of a number of readily available liquid fuels (e.g., diesel, gasoline, etc.). Additionally, in certain embodiments, at least a portion of compressed gas in oxidizing agent chamber 108 surrounds a portion of the fuel chamber 106 (e.g., a flexible bladder 111), thereby pressurizing liquid fuel 118b in flexible bladder 111 such that liquid fuel 118b may be provided to fuel cell 104.

Figure 4:
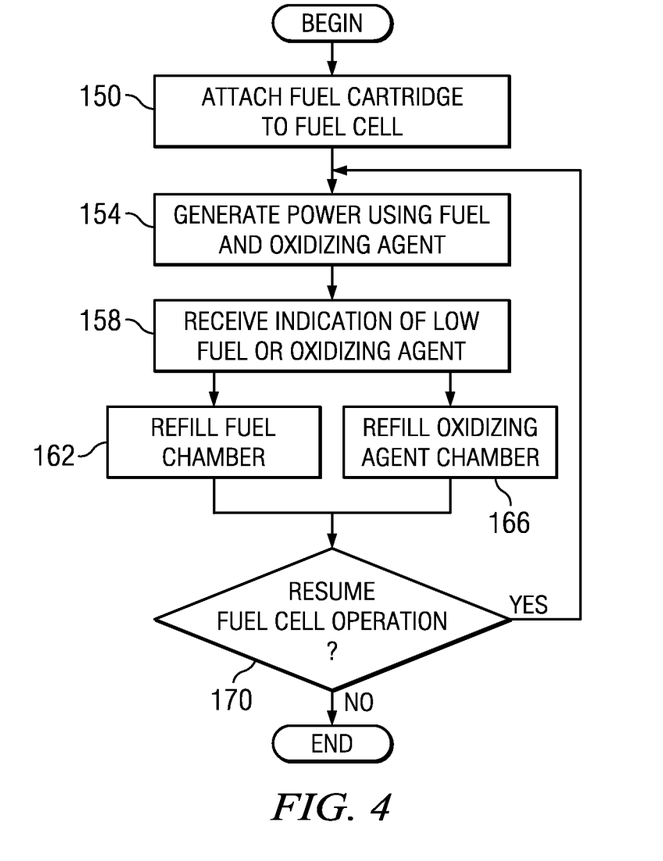
FIG. 4 illustrates an example method that may be performed to recharge the field-rechargeable fuel cell system of FIG. 1.

FIG. 4 illustrates an example method that may be performed to recharge the field-rechargeable fuel cell system 100 of FIG. 1. The method begins as a fuel cartridge is attached to a fuel cell at step 150. As an example, fuel cartridge 102 may be removably or permanently attached to fuel cell 104 to form fuel cell system 100. Attaching fuel cartridge 102 to fuel cell 104 may include connecting a fuel inlet port 110 of fuel cell 104 with a fuel outlet port 114 of fuel cartridge 102 such that fuel 118 from fuel cartridge 102 may be supplied to fuel cell 104 and connecting an oxidizing agent inlet port 112 of fuel cell 104 with an oxidizing agent outlet port 116 of fuel cartridge 102 such that an oxidizing agent 120 from fuel cartridge 102 may be supplied to fuel cell 104.

At step 154, power is generated using fuel and an oxidizing agent. As an example, fuel cell 104 may generate electrical energy using fuel 118 and oxidizing agent 120 received from fuel cartridge 102. The power may be supplied to a load, such as a military radio or other suitable device. In certain embodiments, the power supplied to the load is similar to power (e.g., may have similar electrical characteristics such as equivalent voltage and current) that would be supplied to the load if a conventional battery were used in place of the fuel cell system 100.

At step 158, an indication of low fuel or low oxidizing agent is received. As an example, fuel cartridge 102 may include pressure gauge 122 that provides an indication of the pressure of a fuel 118 included within fuel chamber 106. In addition or as an alternative, fuel cartridge 102 may include an electrical or mechanical device that displays the amount of fuel 118 remaining or the amount of time remaining until the fuel 118 is expended by fuel cell 104. As another example, one or more portions of fuel cartridge 102 may be made of a substantially translucent material such that an amount of liquid fuel 118b remaining in fuel cartridge 102 may be visually observed.

An indication of a low amount of oxidizing agent 20 may be provided in any suitable manner. For example, fuel cartridge 102 may include pressure gauge 126 that provides an indication of the pressure of compressed gas included within oxidizing agent chamber 108. In addition or as an alternative, fuel cartridge 102 may include an electrical or mechanical device that displays the amount of compressed gas remaining or the amount of time remaining until the oxidizing agent 120 is expended by fuel cell 104. After an indication of low fuel and/or low oxidizing agent is received, the fuel, oxidizing agent, or both the fuel and the oxidizing agent may be refilled at steps 162 and/or 166. Additionally or alternatively, the present disclosure contemplates refilling the fuel, oxidizing agent, or both the fuel and the oxidizing agent at any suitable time according to particular needs. At step 162, the fuel chamber is refilled. As an example, fuel chamber 106 of fuel cartridge 102 is replenished with additional fuel 118. In certain embodiments, fuel cartridge 102 is detached from fuel cell 104 before refueling. In various embodiments, a port module 115 is removed from the rest of fuel cartridge 102 before refueling begins. Refueling may be accomplished in any suitable manner. As an example, a source of a compressed fuel (e.g., propane) may be attached to fuel chamber 106 via fill port 124 and the compressed fuel may pass through fill port 124 into the fuel chamber 106. As another example, an interchangeable container may be removed from fuel chamber 106 and replaced with a compatible container that includes additional fuel 118. As yet another example, a liquid fuel 118b, such as gasoline or diesel, may be poured into fuel chamber 106b.

At step 166, the oxidizing agent chamber is refilled. As an example, oxidizing agent chamber 108 of fuel cartridge 102 may be replenished with additional compressed gas including oxidizing agent 120. Oxidizing agent chamber 108 may be refilled in any suitable manner. As an example, fuel cartridge 102 may include one or more fill ports 128 operable to receive compressed gas. For example, fill port 128 may interface with an air compressor, bicycle pump, valve stem of a tire, tank including compressed oxygen, or other suitable source of a compressed gas, such as air or oxygen. As another example, hand pump 130 may be actuated resulting in the addition of compressed air into oxidizing agent chamber 108.

After fuel chamber 106 and/or oxidizing agent chamber 108 has been refilled, port module 115 or other lid may be reattached to fuel cartridge 102 and fuel cartridge 102 may be reattached to fuel cell 104. At step 170, it is determined whether fuel cell operation should resume. If the operation of fuel cell 104 is resumed, the method returns to step 154, where power is generated using fuel 118 and oxidizing agent 120. If fuel cell operation is not resumed, the method ends.

Although the present disclosure describes or illustrates particular steps as occurring in a particular order, the present disclosure contemplates any suitable steps occurring in any suitable order. Moreover, the present disclosure contemplates any suitable steps being repeated one or more times in any suitable order. Although the present disclosure describes or illustrates particular steps as occurring in sequence, the present disclosure contemplates any suitable steps occurring at substantially the same time, where appropriate.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A cartridge, comprising:
    a fuel chamber configured to store a liquid fuel, the fuel chamber having a fuel outlet port configured to removably connect to a fuel cell and, when connected to the fuel cell, to interface with the fuel cell such that the fuel is supplied to the fuel cell from the fuel chamber; and
    an oxidizing agent chamber configured to store a compressed gas oxidizing agent, the oxidizing agent chamber having an oxidizing agent outlet port configured to removably connect to an oxidizing agent inlet port of the fuel cell and when connected to interface with the oxidizing agent outlet port of the fuel cell such that the oxidizing agent is provided to the fuel cell from the oxidizing agent outlet port,
    wherein the oxidizing agent chamber has a fill port or opening separate from the oxidizing agent outlet port, the fill port or opening configured to enable refill of the oxidizing agent chamber with compressed gas oxidizing agent from a source selected from a group consisting of an air compressor, a compressed air tank, a tire, a bicycle pump and a hand pump,
    wherein the fuel chamber comprises a flexible bladder that is configured to store the fuel, and wherein the cartridge is configured such that at least a portion of the compressed gas oxidizing agent stored in the oxidizing agent chamber contacts at least a portion of the flexible bladder to pressurize the fuel stored in the flexible bladder.

2. The cartridge of claim 1, wherein the fuel chamber has a fill port or opening separate from the fuel outlet port, the fill port or opening configured to enable refill of the fuel chamber with liquid fuel.

3. The cartridge of claim 2, wherein the compressed gas oxidizing agent stored in the oxidizing agent chamber comprises compressed air that has a pressure greater than a pressure of ambient air outside of the cartridge.

4. The cartridge of claim 2, wherein the compressed gas oxidizing agent stored in the oxidizing agent chamber comprises compressed oxygen.

5. The cartridge of claim 1, wherein the oxidizing agent chamber is configured to receive the compressed air via the fill port or opening that is configured to refill the oxidizing agent chamber.

6. The cartridge of claim 1, wherein the fill port or opening is configured to interface with a valve stem of the tire such that the compressed air is supplied to the oxidizing agent chamber from the tire.

7. The cartridge of claim 1, wherein the oxidizing agent chamber is configured to interface with the hand pump that is configured to supply the compressed air to the oxidizing agent chamber.

8. The cartridge of claim 1, wherein the fuel comprises one or more of diesel and gasoline.

9. The cartridge of claim 1, wherein the cartridge is configured to detach from the fuel cell.

10. A fuel cell system, comprising:
    a fuel cartridge comprising:
        a fuel chamber configured to store a liquid fuel, the fuel chamber having a fuel outlet port configured to removably connect to a fuel cell and, when connected to the fuel cell, to interface with the fuel cell such that the fuel is supplied to the fuel cell from the fuel chamber; and
        an oxidizing agent chamber configured to store a compressed gas oxidizing agent, the oxidizing agent chamber having an oxidizing agent outlet port configured to removably connect to an oxidizing agent inlet port of the fuel cell and when connected to interface with the oxidizing agent outlet port of the fuel cell such that the oxidizing agent is provided to the fuel cell from the oxidizing agent outlet port,
        wherein the oxidizing agent chamber has a fill port or opening separate from the oxidizing agent outlet port, the fill port or opening configured to enable refill of the oxidizing agent chamber with compressed gas oxidizing agent from a source selected from a group consisting of an air compressor, a compressed air tank, a tire, a bicycle pump and a hand pump, and
        wherein the fuel chamber comprises a flexible bladder that is configured to store the fuel, and wherein the cartridge is configured such that at least a portion of the compressed gas oxidizing agent stored in the oxidizing agent chamber contacts at least a portion of the flexible bladder to pressurize the fuel stored in the flexible bladder; and
    a fuel cell coupled to the fuel cartridge, the fuel cell configured to:
        receive the compressed gas from the fuel cartridge via the compressed gas inlet port;
        receive the fuel from the fuel cartridge via the fuel inlet port; and
        generate electrical energy using the received fuel and the oxidizing agent contained in the received compressed gas.

11. The fuel cell system of claim 10, wherein the oxidizing agent comprises oxygen.

12. The fuel cell system of claim 10, wherein the compressed gas containing the oxidizing agent comprises compressed air that has a pressure greater than a pressure of ambient air outside the fuel cell system.

13. The fuel cell system of claim 10, wherein the compressed gas containing the oxidizing agent comprises compressed oxygen.

14. The fuel cell system of claim 10, wherein the oxidizing agent chamber is configured to provide the compressed gas that is stored in the oxidizing agent chamber to the fuel cell during a period of time in which the oxidizing agent chamber is not receiving air or additional compressed gas from outside the chamber.

15. The fuel cell system of claim 10, wherein the fuel cell includes a first electrical interface that includes a first plurality of electrical contacts that have a same size and shape as a second plurality of electrical contacts of an electrical interface type that is used by a plurality of distinct battery types.

16. A method, comprising:
    providing fuel from a fuel chamber of a cartridge to a fuel cell via a removable connection between a fuel outlet port of the cartridge and a fuel inlet port of the fuel cell;
    providing a compressed gas from an oxidizing agent chamber of the cartridge to the fuel cell via a removable connection between an oxidizing agent outlet port of the cartridge and an oxidizing agent inlet port of the fuel cell;
wherein the cartridge comprises:
the fuel chamber, wherein the fuel chamber is configured to store a liquid fuel, the fuel chamber having a fuel outlet port configured to removably connect to a fuel cell and, when connected to the fuel cell, to interface with the fuel cell such that the fuel is supplied to the fuel cell from the fuel chamber; and
the oxidizing agent chamber, wherein the oxidizing agent chamber is configured to store a compressed gas oxidizing agent, the oxidizing agent chamber having an oxidizing agent outlet port configured to removably connect to an oxidizing agent inlet port of the fuel cell and when connected to interface with the oxidizing agent outlet port of the fuel cell such that the oxidizing agent is provided to the fuel cell from the oxidizing agent outlet port,
wherein the oxidizing agent chamber has a fill port or opening separate from the oxidizing agent outlet port,
wherein the fuel chamber comprises a flexible bladder that is configured to store the fuel, and wherein the cartridge is configured such that at least a portion of the compressed gas oxidizing agent stored in the oxidizing agent chamber contacts at least a portion of the flexible bladder to pressurize the fuel stored in the flexible bladder
utilizing, by the fuel cell, the fuel from the cartridge and an oxidizing agent of the compressed gas from the cartridge to generate electrical energy;
providing the electrical energy to a load; and
refilling, using the fill port or opening separate from the oxidizing agent outlet port, the oxidizing agent chamber with compressed gas oxidizing agent from a compressed air source selected from a group consisting of an air compressor, a compressed air tank, a tire, a bicycle pump and a hand pump.

17. The method of claim 16, further comprising providing an indication of an amount of compressed gas that remains in the oxidizing agent chamber.

18. The method of claim 16, further comprising:
Refilling the fuel chamber using a fill port or opening separate from the fuel outlet port.

19. The method of claim 16, wherein the fill port or opening used for refilling the oxidizing agent chamber is an air inlet port, and wherein the compressed gas is compressed air and the air inlet port is configured to interface with a valve stem of the tire such that the compressed air is supplied to the oxidizing agent chamber from the tire.

20. The method of claim 16, wherein the compressed gas is compressed air provided by the hand pump.

21. The method of claim 16, wherein the oxidizing agent chamber provides the compressed gas to the fuel cell during a period of time in which the oxidizing agent chamber is not receiving air or additional compressed gas from outside the oxidizing agent chamber.

* * * * *